Nov. 7, 1939.   B. D. McINTYRE   2,178,692

SPRING SHACKLE

Filed Jan. 30, 1939

INVENTOR
BROUWER D. McINTYRE
BY
ATTORNEYS

Patented Nov. 7, 1939

2,178,692

UNITED STATES PATENT OFFICE 2,178,692

SPRING SHACKLE

Brouwer D. McIntyre, Monroe, Mich., assignor to Monroe Auto Equipment Company, Monroe, Mich., a corporation of Michigan Application January 30, 1939, Serial No. 253,645

4 Claims. (Cl. 280—54)

This invention relates generally to oscillating connections and refers more particularly to spring shackles of the type used to connect at least one end of a semi-elliptical vehicle suspension spring to a supporting structure.

One of the principal objects of this invention is to provide an improved shackle construction composed of a relatively few simple parts capable of being inexpensively manufactured, assembled and installed.

A further feature of this invention consists in the provision of a shackle of the type set forth possessing the rigidity required to withstand continuous hard usage without impairing the efficient operation thereof and without developing objectionable noise.

The foregoing, as well as other objects, will be made more apparent as this description proceeds, especially when considered in connection with the accompanying drawing, wherein—

In order to perhaps more forcibly illustrate the advantages of my improved shackle construction, reference will be made briefly to one type of spring shackle which has achieved considerable popularity in the trade due to its simple inexpensive construction and efficient operation. In general, the spring shackle referred to comprises a U-shaped bolt having a washer mounted on each leg portion of the bolt in sufficient spaced relation to the base portion of the bolt to receive the weld provided for the purpose of integrally connecting the washers to the leg portions of the bolt. The inner surfaces of the washers form an abutment for rubber bushings sleeved on the leg portions and secured under compression against the washers by means of a clamping plate having spaced openings therein for receiving the free ends of the leg portions. The opposite ends of the clamping plate abut the free ends of the rubber bushings and the desirable endwise pressure is applied to the bushings by means of clamping nuts threaded on the free ends of the leg portions of the U-shaped bolt in a manner to engage the plate. It will, of course, be understood that the U-shaped bolt with the rubber bushings on the leg portions thereof are assembled with the parts to be shackled together prior to mounting the pressure plate on the free ends of the leg portions of the bolt and the extent of endwise pressure applied to the bushings by the pressure plate through the clamping nuts is sufficient to prevent slipping of the bushings, with the result that oscillating movement between the shackle parts is accomplished by interparticle flow of the rubber bushings.

While the above type of shackle has proved generally satisfactory in operation and is relatively inexpensive to manufacture, nevertheless, my improved shackle, forming the subject matter of this invention, is not only just as efficient in operation, but is simpler in construction rendering it possible to reduce the cost of manufacture and expedite assembly. In addition, it will be noted from the following description that my improved shackle is more efficient than the prior art construction briefly outlined above in that the construction is more rigid and there is less likelihood for objectionable noises to incur during continued hard usage.

Figure 1:
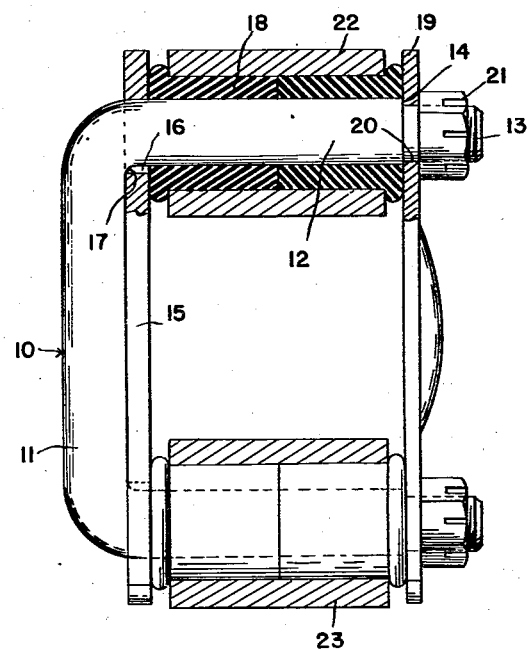
Figure 1 is a sectional elevational view of a shackle constructed in accordance with this invention.
Figure 2:
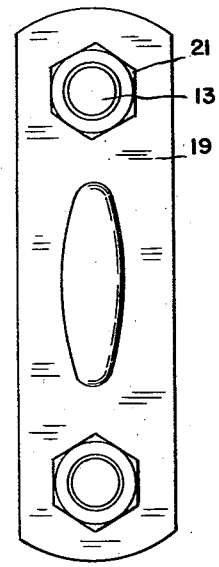
Figure 2 is an end elevational view of the construction shown in Figure 1.
Figure 3:
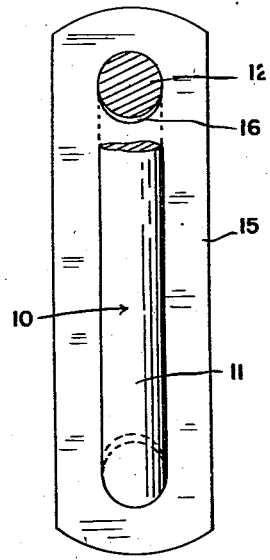
Figure 3 is an elevational view of the opposite end of the shackle.

With the above in mind, reference will now be made to the shackle selected herein for the purpose of illustrating the present invention. In detail, the shackle is shown in Figure 1 as comprising a load supporting member in the form of a U-bolt 10 having a base portion 11 and having substantially parallel leg portions 12. The bolt 10 is preferably formed of one-piece construction and the free ends 13 of the leg portions are reduced to provide shoulders 14.

A backing plate 15 is slidably mounted on the leg portions 12 of the U-shaped bolt 10 in juxtaposed relation to the base 11 and is formed with openings 16 therethrough for slidably receiving the leg portions 12 of the bolt. The openings 16 are elliptical in shape or, in other words, are elongated in the direction of length of the base portion 11 of the bolt to receive the radius 17 formed at the juncture of each leg portion 12 with the base portion 11 of the bolt and thereby permit the backing plate to rest against, or to assume a position immediately adjacent the base portion 11 of the bolt. It should also be noted that the radially outer walls of the openings 16 rest against, or engage the adjacent portions of the legs 12 of the bolt with the result that the backing plate 15 forms a structural reinforcing element, or stiffening member to assist the U-shaped bolt in carrying the load and thereby reduce distortion of the shackle to the minimum.

The backing plate 15, previously discussed, takes the place of the washers referred to in connection with the prior art shackle construction briefly outlined above and, in addition to possessing the above advantages incapable of being obtained by the washers, also reduces the overhang or length of the leg portions 12 required to accommodate the assembly. In other words, it is not necessary to provide a space between the base portion 11 of the U-shaped bolt 10 and the plate 15 to accommodate the weld required in the prior art construction to secure the washers in place. Any reduction in the overhang or length of the leg portions 12 is, of course, advantageous in that it reduces the stress on the base portion 11 of the U-shaped bolt.

The backing plate 15 also forms an abutment for rubber bushings 18 sleeved upon the leg portions 12 and held under compression against the backing plate 15 by means of a clamping plate 19 having spaced openings 20 therethrough for slidably receiving the free ends 13 of the leg portions 12. The clamping plate 19 is secured against the shoulders 14 by means of clamping nuts 21 threadedly mounted on the ends 13 of the leg portions 12. It will, of course, be understood that the length of the bushings 18 is such that when the plate 19 is secured by the nuts 21 against the shoulders 14, the bushings 18 are held under compression between the backing plate 15 and clamping plate 19.

Before assembling the plate 19 on the leg portions 12 of the U-shaped bolt, the leg portions 12, together with the bushings 18, are respectively inserted in bushings 22 and 23 carried by the parts it is desired to connect by the shackle. The clamping plate 19 is then secured in place by the nuts 21 and the resulting endwise pressure exerted on the bushings 18 is sufficient to not only effectively clamp the backing plate 15 against the base portion 11 of the U-shaped bolt, but to also prevent slipping of the rubber bushings 18 relative to either the leg portions 12, or the bushings 22, 23. As a result, relative movement of the parts shackled together is permitted by interparticle flow of the rubber bushings and the backing plate 15 is effectively secured in place.

From the foregoing, it will be noted that the shackle, forming the subject matter of this invention, is a decided improvement over prior art shackles of the type briefly outlined above. It will also be noted that my improved shackle construction is composed of the minimum number of parts and, as a result, may be inexpensively manufactured and expediently assembled. In addition, it will be apparent that the backing plate 15 forms a structural element of the shackle to appreciably increase the rigidity of the latter and since there is no tendency for the backing plate to work loose in the assembly, it follows that noiseless efficient operation is insured over a long period of use.

What I claim as my invention is:

1. A shackle construction comprising a substantially U-shaped connecting member having a base portion and having substantially parallel leg portions, a backing plate having openings therethrough spaced from each other a distance corresponding to the distance between the leg portions to slidably receive said leg portions and positioned on the leg portions in juxtaposed relation to the base portion of the U-shaped member, bushings of rubber material sleeved on the leg portions, and means mounted on the free ends of the leg portions and engageable with the adjacent ends of the bushings to hold the latter under compression against said plate and to clamp the plate against the base of the U-shaped member.

2. A shackle construction comprising a substantially U-shaped load supporting bolt having a base portion and having substantially parallel leg portions, a backing plate having spaced openings therethrough freely slidably receiving the leg portions of the bolt and positioned in juxtaposed relation to the base portion of the bolt in a manner to cooperate with the latter in supporting the load, a bushing of rubber material mounted on each of the leg portions and abutting the backing plate, and means mounted on the free ends of the leg portions and engageable with the adjacent ends of the bushings to apply an endwise pressure on said bushings.

3. A shackle construction comprising a substantially U-shaped load supporting bolt having a base portion and having substantially parallel leg portions, a backing plate having spaced openings therethrough freely slidably mounted on the leg portions of the U-shaped bolt and positioned in juxtaposed relation to the base portion of said bolt to cooperate with the latter in supporting the load, a bushing of rubber material mounted on each of the leg portions and abutting the backing plate, a clamping plate mounted on the free ends of the leg portions of the U-shaped bolt in abutting engagement with the adjacent ends of the bushings, and means secured to the ends of the leg portions of the bolt and cooperating with the clamping plate to secure the bushings under compression between the said plates.

4. A shackle construction comprising a substantially U-shaped load supporting bolt having a base portion and having substantially parallel leg portions of substantially the same cross sectional area throughout the major portion of the length thereof as the base portion, a backing plate having openings therethrough spaced from each other a distance corresponding to the distance between the leg portions to slidably receive the leg portions and positioned against the base portion of the U-shaped bolt, bushings of rubber material sleeved on the leg portions and means mounted on the free ends of the leg portions of the bolt and engageable with the adjacent ends of the bushings to hold the latter under compression against the backing plate and to clamp the backing plate against the base of the U-shaped bolt.

BROUWER D. McINTYRE.